July 23, 1940.  E. E. LITTLEFIELD  2,209,126

ELECTRICAL CONTROLLING APPARATUS AND METHOD

Original Filed May 23, 1928

INVENTOR.

BY Edgar Earle Littlefield

ATTORNEY.

Patented July 23, 1940

2,209,126

UNITED STATES PATENT OFFICE 2,209,126

ELECTRICAL CONTROLLING APPARATUS AND METHOD

Edgar Earle Littlefield, Los Angeles, Calif.

Original application May 23, 1928, Serial No. 280,025. Divided and this application March 31, 1936, Serial No. 71,912

9 Claims. (Cl. 171—242)

This invention relates to an electrical control system of the type in which a translating device is arranged on the primary side of a transformer, or similar device, and which translating device is controlled by appropriate means on the secondary side thereof. In certain cases a translating device may be arranged on the secondary side, as will appear from the following, and controlled from the primary side. Preferably the voltage of the current supplied to the secondary side of the transformer is sufficiently low to prevent arcing or heating of contact points and, moreover, enables it to be manipulated or controlled with safety.

Figure 1:
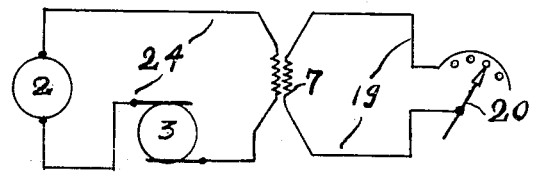
Figure 2:
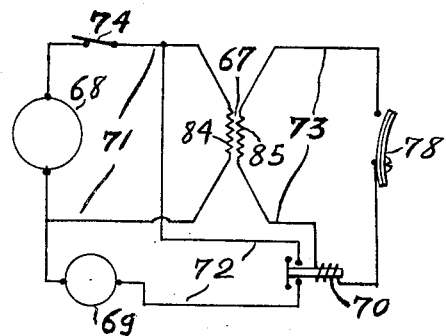
Figure 6:
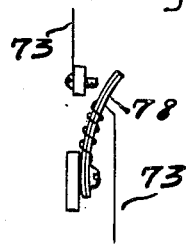

Numerous objects and advantages will appear from the following description when considered in connection with the accompanying drawing in which, Fig. 1 illustrates, diagrammatically, a translating device arranged on the primary side of a transformer and controlled by a rheostat, or similar device, on the secondary side, Fig. 2 shows a modified embodiment in which the translating device takes the form of a valve or motor for controlling a fluid supply, the valve controlling circuit being controlled by means of a relay included in the secondary circuit. In this embodiment a thermostatic switch may, when desired, be substituted for the rheostat control described in connection with Fig. 1, Fig. 3 is another embodiment showing a clock controlled switch which may, when desired, be substituted for either the thermostatic or rheostat means in the arrangements previously referred to, Fig. 4 discloses a modification in which the controlling means may take the form of controlling electrodes in a flushing system, Fig. 5 is a further modification of a flushing system in which a relay is employed to control the valve used in the system, while Fig. 6 shows a thermostat which may be employed in the above arrangements in certain cases and when desired.

In Fig. 1, 7 represents a transformer having a low tension secondary circuit 19 which includes a rheostat 20 for which may be substituted when necessary or desirable any other equivalent device. The primary circuit of the transformer includes a translating device 2 of any desirable type and a source of alternating current 3. Obviously, current from an ordinary service main may be utilized for energizing the primary circuit 24 instead of that supplied by the generator 3. When desired a time controlled switch may be substituted for the rheostat 20. If we assume that the circuits are closed it will be evident that when current flows to the transformer it may be regulated by the rheostat which, in turn, controls the actuation of the translating device.

In Fig. 2 I have shown a modified embodiment in which 67 represents a transformer having a low tension secondary winding 85 to which is connected a secondary circuit 73 which contains a relay 70 and a thermostatic controlling device 78. To the primary winding 84 of the transformer is connected a high tension primary circuit 71, it being assumed that the transformer is connected to a source of current such as an ordinary service main or its equivalent 68. A switch element 74 may be employed for interrupting the circuit when desired. The branch circuit 72 includes a relay 70 by means of which a fluid supply controlling means 69 is controlled. Fluids such as water, air, steam, gas or oil may be controlled. By utilizing low voltage in the secondary circuit a device may be controlled from a distance without danger of fire or burning of contact points. The Telecode relay made by the Benjamin Electric Mfg. Co. of Des Plaines, Ill., under Patent No. 1,272,432 dated July 16, 1918, is a desirable type to employ in the various forms of my invention.

Figure 3:
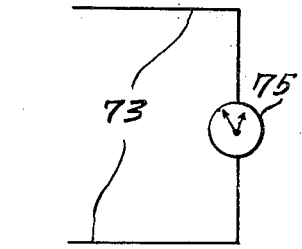

In Fig. 3 a clock 75 is shown as substituted for the device 78 in circuit 73. Obviously, instead of being substituted for the device 78 the clock 75 may be included in the circuit 73 along with the device 78 and employed to control the latter.

Figure 4:
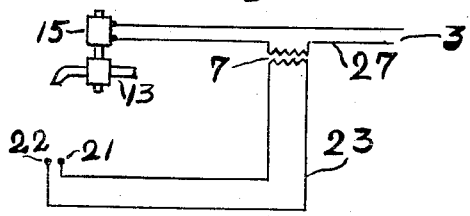
Figure 5:
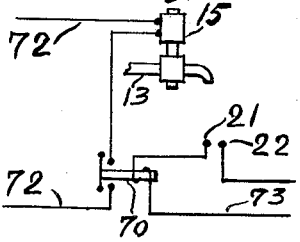

A modified circuit arrangement for automatically operated electrically controlled urinals is shown in Fig. 4. In this embodiment the source of flushing fluid 13 is controlled by means of an electrically controlled valve 15 arranged on the primary side of a step down transformer 7 and connected by circuit 27 to energizing means 3 such as an ordinary alternating current service main. A low tension circuit 23 connects the electrodes 21 and 22 with the transformer secondary. For a fuller disclosure of this embodiment of my invention attention is directed to my Patent No. 1,709,083 of April 16, 1929.

Fig. 5 shows circuit 73 of Fig. 2 controlling circuit 72 by means of the electrodes 21 and 22 and a Telecode relay 70, for which may be substituted, when desired, any other suitable type.

The arrangement shown in Fig. 6 may, when desired, be employed to prevent fluttering of contact points or, in other cases, to delay or retard the closing of a translating device such as an electrical valve. In like manner the period of operation of any other translating device may be prolonged. If a few turns of circuit 73, for instance, is wound on to the arm of the thermostat 78. the heat developed in the arm by means of the turns, when the circuit is closed, will cause the arm of the thermostat to remain closed longer by a considerable period than would otherwise be possible. Obviously, this is a desirable feature in many systems such, for instance, as in electrically controlled flushing systems. By a slightly modified arrangement, such as that shown in Fig. 1 of my co-pending application No. 616,955, the thermostatic member may be incorporated in the primary circuit of the transformer.

The modification of my control system employing a thermostatic control may be employed for controlling the temperature of a room or compartment or for controlling the temperature of a compartment in a refrigerating system, or the like.

The timing system I have disclosed affords a simple and inexpensive expedient for timing the operation of irrigating or heating systems, or the like, so that their operation may correspond to requirements.

In the various views like characters refer to like parts.

This application contains subject matter common to my copending applications Nos. 280,025, filed May 23, 1928, now Patent No. 2,129,331; 565,589, filed September 28, 1931, now Patent No. 2,070,607; and 616,955, filed June 13, 1932; and the applications referred to therein; and is a division of the first mentioned application, and a continuation in part of application No. 616,955.

While I have shown and described certain embodiments of my invention I wish it to be understood that I do not desire to be limited to the details thereof since various modifications may occur to a person skilled in the art.

I claim:

1. As an article of manufacture, an electrical control system including a step down transformer adapted to supply secondary current and normally connected in closed circuit relation with the supply mains; liquid supply controlling means on the primary side of said transformer; means including a thermostatically controlled circuit and a relay for utilizing said secondary current to control said liquid supply controlling means from the secondary side of the transformer.

2. As an article of manufacture, an electrical control system including a step down transformer adapted to supply low voltage secondary current and normally connected in closed circuit relation with the supply mains; means including an electric motor on the primary side of said transformer adapted to control a supply of fluid fuel; a secondary circuit connected to be energized by said secondary current and a relay controlled by said circuit; thermostatic means adapted to control said secondary circuit.

3. As an article of manufacture, an electrical control system including a step down transformer adapted to supply low voltage secondary current; a translating device; an electric circuit connected to be energized by said secondary current and a relay controlled thereby; thermostatic means controlled by the temperature of the surrounding atmosphere controlling said circuit; a source of electrical energy normally connected in closed circuit relation with said transformer, the translating device being connected in parallel relation with said transformer on the primary side thereof and normally in open circuit series relation with the contacts of said relay and said source of energy, the relay controlling the translating device.

4. As an article of manufacture, an electrical control system including a step down transformer adapted to supply low voltage secondary current and normally connected in closed circuit relation with the supply mains; means on the primary side of the transformer adapted to control a carbonaceous fuel supply; means including an electric circuit and a relay for utilizing said secondary current to control said fuel supply controlling means from the secondary side of the transformer; and thermostatic means controlled by the temperature of the surrounding atmosphere for controlling said circuit.

5. As an article of manufacture, an electrical control system including a step down transformer adapted to supply low voltage secondary current; a translating device; means including an electric circuit connected to be energized by said secondary current and a relay controlled thereby for controlling said translating device from the secondary side of the transformer; thermostatic means controlled by the temperature of the surrounding atmosphere controlling said circuit; a source of electrical energy normally connected in closed circuit relation with said transformer, the translating device being connected in parallel relation with said transformer on the primary side thereof and normally in open circuit relation with said source of energy.

6. As an article of manufacture, an electrical control system including a step down transformer adapted to supply low voltage secondary current and normally connected in closed circuit relation with the supply mains; means on the primary side of said transformer adapted to control a supply of fluid fuel; a secondary circuit connected to be energized by said secondary current and a relay controlled by said circuit, the relay controlling the fuel supply controlling means; single contact thermostatic means controlling said secondary circuit.

7. As an article of manufacture, an electrical control system including a transformer having relatively stationary windings and normally connected in closed circuit relation with the supply mains; an electrical converting device adapted to convert the energy of an alternating current into mechanical energy; means including an electric circuit inductively related to said converting device through the transformer designed to control the actuation of the same from a remote point, said circuit having a controlling switch therein adapted to open and close said circuit, said means permitting the electromotive force of the controlling current to be so reduced that the actuation of the converting device may be controlled from the secondary side of the transformer without overheating the controlling means.

8. An electrical control system including a transformer having relatively stationary windings and adapted to supply secondary current, said transformer being normally connected in closed circuit relation with the supply mains; an electrical device adapted to convert the energy of an alternating current into mechanical energy, said device being arranged otherwise than on the secondary side of the transformer but so that its actuation may be controlled from the secondary side; and remote control means formed partly by the secondary winding of the transformer adapted to so reduce the electromotive force of the secondary current that the starting of the converting device may be controlled from the secondary side of the transformer without overheating the starting controlling means.

9. The method of controlling the actuation of an electrical converting device adapted to convert the energy of an alternating current into mechanical energy which device is arranged on the primary side of a transformer having energizing means common to said converting device and which is normally connected in closed circuit relation with said means which consists in reducing the electromotive force of the secondary current supplied by said means to a comparatively low voltage by means of a secondary circuit formed partly by the secondary winding of the transformer and so connected as to be dependent for its electromotive force entirely upon said energizing means and controlling the actuation of the converting devices by means of said circuit but independently of energy supplied by said energizing means and without varying the relative position of the windings of the transformer.

EDGAR EARLE LITTLEFIELD.